United States Patent
Charleville et al.

[15] 3,670,998
[45] June 20, 1972

[54] SEVERANCE OF POLYCARBONATE MATERIAL CANOPY TRANSPARENCY

[72] Inventors: Joseph L. Charleville, Kirkwood; Mart E. De Tienne, St. Louis County; Charles W. Lammert, St. Charles, all of Mo.

[73] Assignee: The United States of America as represented by the Secretary of the Air Force

[22] Filed: July 10, 1970

[21] Appl. No.: 53,727

[52] U.S. Cl. .................................. 244/121, 244/122 AF
[51] Int. Cl. ............................................. B64c 1/14
[58] Field of Search .............................. 244/121, 122

[56] References Cited

UNITED STATES PATENTS 3,547,382 12/1970 Stanley .................................. 244/121

Primary Examiner—Milton Buchler
Assistant Examiner—Carl A. Rutledge
Attorney—Harry A. Herbert, Jr. and Arsen Tashjian

[57] ABSTRACT

Method for permitting the emergency bail-out from an aircraft having a frangible polycarbonate material canopy transparency by a person in an ejection seat. A flexible linear shaped charge is used to sever the polycarbonate canopy transparency in lieu of jettisoning the canopy. The charge, after ignition and explosion, severs the canopy transparency around the forward arch, back along the canopy side frame, and up the canopy to the rear of the seat to a point which leaves an unsevered section, of preselected length, of the canopy transparency. This unsevered section serves as a hinge and as a retaining means, and as the seat is ejected from the aircraft the severed section of the canopy transparency moves backwardly away from the seat, thereby precluding any contact between the canopy transparency and the person in the ejection seat.

1 Claim, 3 Drawing Figures

PATENTED JUN 20 1972 3,670,998

INVENTORS.
JOSEPH L. CHARLEVILLE
MART E. DeTIENNE
BY CHARLES W. LAMMERT
Harry A. Herbert Jr.
Arsen Tashjian
ATTORNEYS

# SEVERANCE OF POLYCARBONATE MATERIAL CANOPY TRANSPARENCY

BACKGROUND OF THE INVENTION

This invention relates to an aircraft, and more particularly, to a novel method for accomplishing the safe bail-out from an aircraft by a person in an ejection seat.

It is conventional that in high-performance aircraft, particularly of the military variety, operating personnel, such as the pilot, co-pilot, navigator and the like, are provided with emergency bail-out escape means. Typically, the sequence of emergency bail-out includes jettisoning of the canopy, automatically or manually, and then the catapulting of the ejection seat, with the person therein, from the crew compartment. Such a bail-out procedure is predicated upon the assumption that the canopy will be fully removed prior to the catapulting of the seat, and that the jettisoned canopy will be sufficiently far from the person in the ejection seat not to strike him. Unfortunately, it is well known in the art that such is not always the situation, and that persons in catapulted ejection seats are injured or killed by being forcefully driven through an unremoved canopy, or by being struck by a jettisoned canopy which is floating nearby.

This invention precludes contact of the canopy with the person in the ejection seat during bail-out, and thereby constitutes a significant advancement in the art.

SUMMARY OF THE INVENTION

This invention relates to a method of safe bail-out from an aircraft having a seat ejection system and a frangible polycarbonate material canopy transparency.

The principal object of this invention is to provide a method of permitting the safe emergency bail-out, of a person in an ejection seat, from an aircraft having a frangible polycarbonate material canopy transparency without jettisoning the canopy.

This principal object, and still other and related objects of this inventive method, will become readily apparent after a consideration of the description of the method and reference to the drawings.

DESCRIPTION OF THE METHOD

Figure 1:
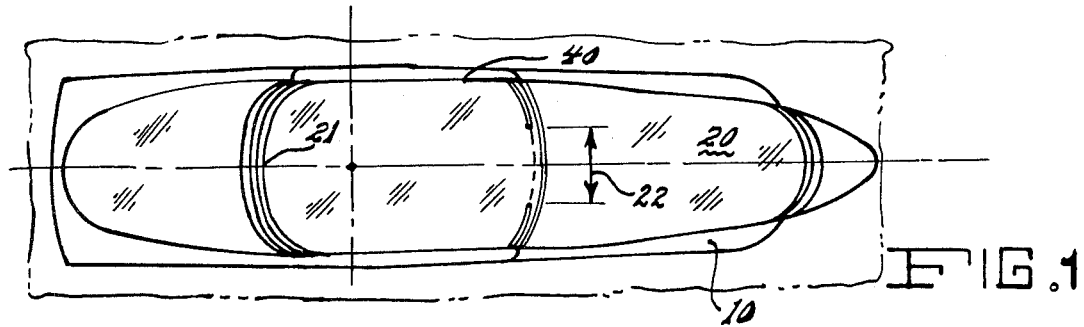
FIG. 1 is a top plan view, in schematic form, of a portion of an aircraft having a canopy transparency embodying the inventive method.
Figure 2:
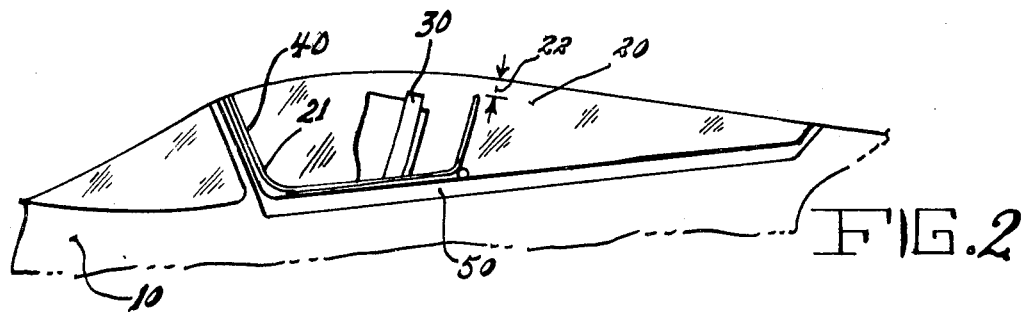
FIG. 2 is a side elevation view, also in schematic form, of a portion of the aircraft, shown in FIG. 1, having a canopy transparency embodying the inventive method.
Figure 3:
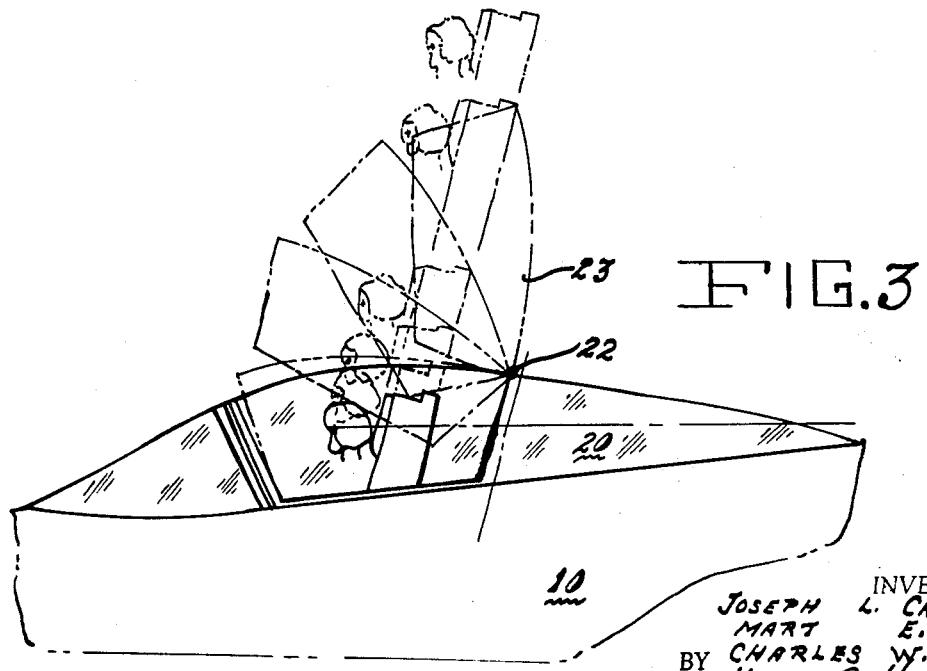
FIG. 3 is also a side elevation view, in schematic form, of a portion of the aircraft, shown in FIGS. 1 and 2, having a canopy transparency embodying the inventive method, and showing in phantom the backward movement of the severed canopy transparency and the upward movement of the ejection seat and the person therein.

With reference to FIGS. 1, 2 and 3, wherein the same components are similarly numbered, aircraft 10 with canopy transparency 20 of frangible polycarbonate material, such as the polycarbonate material manufactured and sold by the General Electric Company of Pittsfield, Massachusetts, under the trade name "Lexan," is equipped with a seat ejection system (not shown) of which ejection seat 30 is a component. The canopy transparency 20 has a flexible linear shaped charge 40, such as manufactured and sold by Explosive Technology of Fairfield, California, affixed to and positioned around the forward arch 21 of canopy transparency 20, along canopy side frame 50 on canopy transparency 20, and up canopy transparency 20 to the rear of ejection seat 30, leaving a section 22 at which none of the flexible linear shaped charge 40 is positioned.

The method, in essence, comprises the step of severing, with the flexible linear shaped charge 40, at a pre-set time prior to seat ejection, polycarbonate canopy 20 around the forward arch 21, along the side frame 50, and up the canopy transparency 20 to the rear of ejection seat 30, leaving an unsevered section 22 of preselected length.

Flexible linear shaped charge 40 is set off, i.e., ignited and exploded, by suitable means heretofore well known in the art.

Unsevered section 22 serves as a hinge and as a retaining means, and allows backward movement, as shown in phantom in FIG. 3, of the severed section 23 of the canopy transparency 20 during ejection of seat 30 with the person therein.

The backward movement of severed section 23 on unsevered section 22, which acts as a hinge and as a retaining means, precludes any contact between severed section 23 of polycarbonate canopy transparency 20 and the person in ejection seat 30.

While there has been shown and described the fundamental features of the inventive method, as applied to a preferred configuration or geometry of the severed section 23 of the polycarbonate material canopy transparency 20, it is to be understood that various substitutions and omissions may be made by those of ordinary skill in the art without departing from the spirit of the inventive method. For example:

The canopy transparency 20 may be severed, with a flexible linear shaped charge, around the forward arch, the aft arch and along the centerline of the top of the transparency 20. The unsevered portions, in this case, would be along each canopy side frame and would serve as the hinges.

What is claimed is:

1. The method of permitting the safe emergency bail-out, from an aircraft having an ejection seat system and a frangible polycarbonate material canopy transparency, by a person in the ejection seat, comprising the step of severing the canopy transparency, by the ignition and the explosion of a flexible linear shaped charge at a preset time prior to seat ejection, around the forward arch of the canopy transparency, along the canopy side frame, and up the canopy transparency to the rear of the ejection seat, leaving an unsevered section of preselected length of the canopy transparency which serves as a hinge and as a retaining means, and which allows backward movement of the severed section of the canopy transparency during seat ejection, thereby precluding any contact between the severed section of the canopy transparency and the person in the ejection seat.

* * * * *